United States Patent Office 2,831,961
Patented Apr. 22, 1958

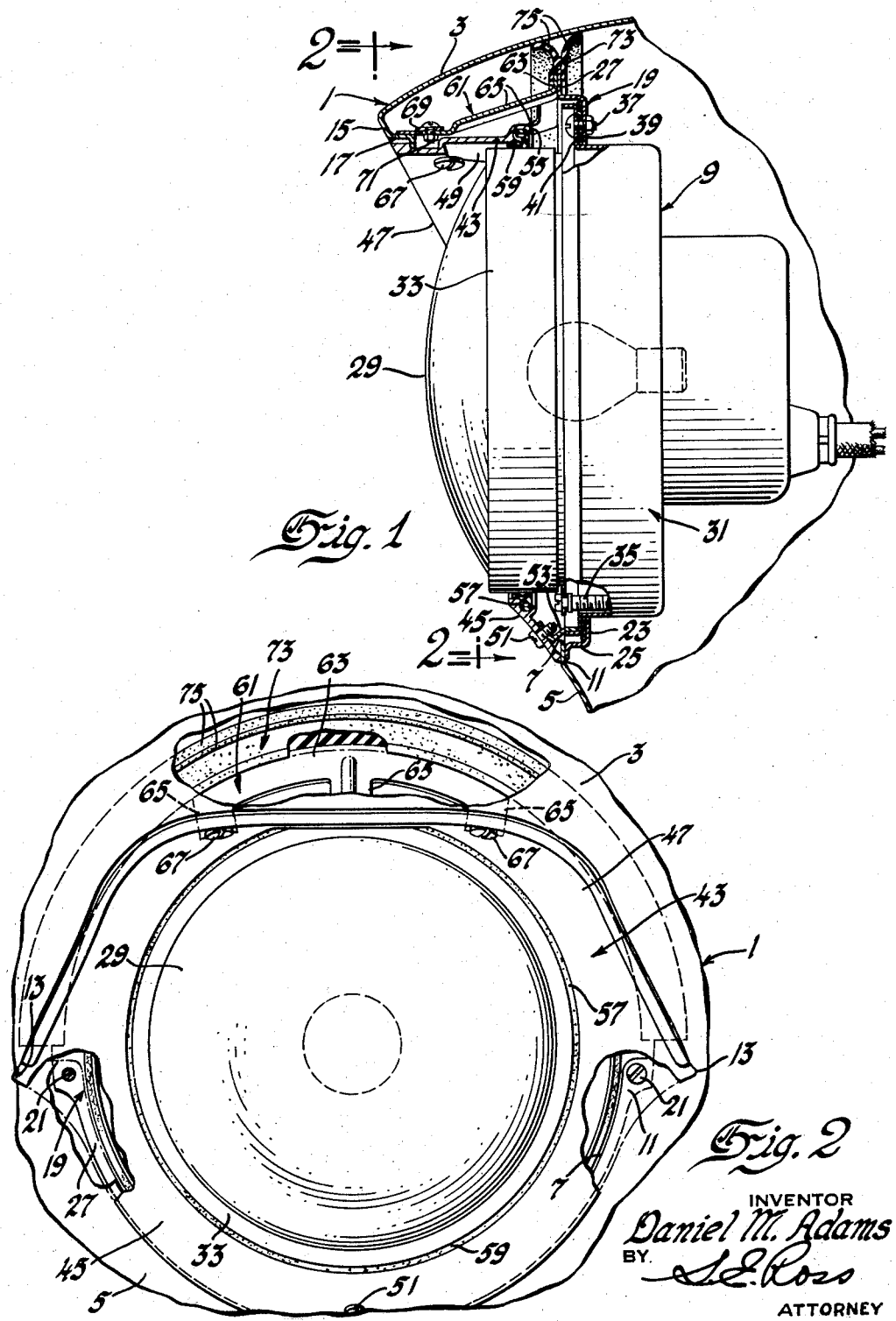

2,831,961
MOTOR VEHICLE FENDER AND HEADLAMP ASSEMBLY

Daniel M. Adams, Birmingham, Mich., assignor to General Motors Corporation, Detroit, Mich., a corporation of Delaware Application August 24, 1953, Serial No. 375,953

6 Claims. (Cl. 240—8.1)

This invention relates to motor vehicle and headlamp assemblies and more particularly to a headlamp mount adapted to be used with a fender of streamlined configuration.

Heretofore vehicle headlamps have been mounted within the lamp receiving aperture provided in the fender in such manner as to position the lens substantially flush with the frontal contour of the fender. At the same time a headlamp door of substantially standard design was positioned about the body aperture having the lamp mounted therein, the door serving merely to finish off the body aperture and conceal the lamp mounting. In an assembly of this type the headlamp was mounted within the fender by means of one or more brackets secured to the inner surface of the fender.

Such headlamp and fender assemblies are inadaptable to the modern vehicle inasmuch as the styling trend of automotive vehicles of the passenger type is toward the radical and striking.

It is therefore an object of my invention to provide a streamline vehicle fender adapted to mount a standard headlamp within an opening provided therein.

It is a further object of my invention to provide a simple and inexpensive headlamp mount adapted for use with a streamline fender.

To attain these objects I employ a ring type support which is secured to the fender and supports the lamp and door.

Further objects and advantages of my invention will be apparent from the following description, reference being had to the accompanying drawing wherein a preferred form of the present invention is clearly shown.

In the drawing:

Fig. 1 is a side elevation with parts broken away of my assembly.

Fig. 2 is a view with parts broken away on line 2—2 of Fig. 1.

Having reference now to Fig. 1 of the drawing there is shown a front fender 1 having an upper arched portion 3 extending over the lower forward portion 5 in the form of a visor. A generally circular opening 7 is provided in the forward end of the fender in which opening there is positioned a headlamp 9, the manner of securing the headlamp within the aperture being more fully described hereinafter.

The lower portion of the opening 7 is defined by a substantially semi-circular flange 11 formed integrally with the lower portion 5 of the fender and extending inwardly in a plane substantially transverse to the longitudinal axis of the vehicle. The visor portion 3 of the fender curves down and to the rear to fair-in with the lower portion of the fender at a point 13 substantially midway of the height of opening 7 thus presenting a clean and finished streamline to the fender. The visor 3 is formed with its front portion 15 extending inwardly and to the rear and having an edge portion 17 extending substantially axially to the rear to form a flange underneath the visor.

The headlamp 9 is mounted within the opening 7 in a relatively simple and inexpensive manner though peculiarly adapted for use with headlamp doors and body styles of radical design. An inner lamp supporting ring 19 is secured within the opening 7 in any suitable manner such as by welding or by means of a plurality of screws. As shown in Fig. 2 ring 19 is removably secured to the fender 1 by a plurality of screws 21.

As is best seen on Fig. 1 ring 19 consists of a central annular recessed portion 23 surrounded by a wall 25, the outer peripheral portion of which is formed in a flange 27. Both the flange 27 and the portion 23 extend respectively radially outward and inward of the wall 25 thus forming a generally cup-shaped member.

Headlamp 9 consists of a lighting unit 29 adjustably secured within a housing 31 by means of a retaining ring 33 and adjusting screws 35. The headlamp 9 is of standard design the details of which are well known in the art and form no part of my invention. As is clearly shown in Fig. 1 headlamp 9 is nested within ring 19 and is removably secured thereto by means of a plurality of screws 37. In order to insure a secure and noiseless connection between the two members a gasket 39 is interposed between the flange 41 of the headlamp and portion 23 of ring 19.

A door 43 is secured to the fender 1 to seal the headlamp 9 within the aperture 7 and at the same time blend in with the streamline of the fender. Door 43 as shown in Fig. 1 consists of a lower substantially semi-circular portion 45 of generally standard design which portion is positioned over flange 11 of the fender. The upper portion 47 of door 43 is formed in a visor which curves down and to the rear to fair-in with the lower portion 45 and is of such dimensions as to cooperate with and finish off the underside of fender visor 3. The inner surface of the portion 47 is provided with a recess 49 at the top thereof to enable a finger grip on the door for its ready removal. The door 43 is secured on the flange 11 by means of a screw 51 which threads into a bracket 53 mounted on the housing 31 of the headlamp.

The inner peripheral edge of the door 43 is turned inwardly to form a channel 55 within which is seated a rubber sealing gasket 57. Gasket 57 has a sealing lip 59 adapted to contact retaining ring 33 thereby sealing the headlamp 9 within the fender 1. The door 43 may be formed in any suitable manner such as by die casting. The inner surface of the top portion 47 and the outer surface of the lower portion 45 are polished and plated, the remaining invisible surfaces being unfinished.

The top portion of the lamp supporting ring 19 is secured to the fender 1 by means of a retainer bracket 61 which consists of a flange-like portion 63 secured to the flange 27 of ring 19 in any suitable manner as by welding. A plurality of spaced forwardly extending fingers 65 are formed integrally with the flange 63 and serve to anchor ring 19 to fender flange 17 as well as furnishing anchor points for the upper portion 47 of door 43. As shown on Fig. 2 bracket 61 is formed with three fingers 65, the two side fingers extending to points immediately adjacent the outer surface of door portion 47 to which they are anchored by means of a pair of screws 67. The central finger extends to a point adjacent fender bracket 69 securely attached to visor flange 17. A screw 71 through flange 69 and adjacent finger 65 serves to anchor ring 19 to fender 1.

A substantially semi-circular sealing strip 73 is positioned on the upper portion of flange 27. This strip is of a generally Y-shaped cross section in the bottom portion in which a groove or rabbet is formed to fit over flange 27. The two upper lips 75 are symmetrically disposed with respect to the bottom portion and contact the inner surface of the fender 1 along spaced lines thus forming two seals and assuring that water and road dirt will be excluded from the pocket-like cavity formed between the fender visor 3, door portion 47 and ring 19.

The assembly of my invention is made by first securing supporting ring 19 within the fender 1, this being accomplished by means of screws 21, interconnecting ring 19 with the ends of substantially semi-circular flange 11, and screw 71, interconnecting central finger 65 of bracket 61 with fender bracket 69. Headlamp 9 is then nested within ring 19 and is secured thereto by means of bolts 37. Headlamp door 43 is then positioned about retaining ring 33, sealing lip 59 being in contact therewith creating an effective seal between the fender and lamp. Door 43 is secured to the fender by means of screws 67 and 51. It is thus that a simple and inexpensive means are provided for mounting and sealing a standard headlamp within a fender of streamline configuration.

While the form of embodiment of the invention as herein disclosed constitutes a preferred form, it is to be understood that other forms might be adopted as may come within the scope of the claims which follow.

What is claimed is:

1. In combination, a fender having a visor-like upper portion extending forwardly and downwardly beyond the plane of and being faired-in with the lower forward portion thereof, an opening in said fender beneath said visor-like portion, a flange formed upon said lower portion about a portion only of the opening, an annular support ring in contact with and secured upon said flange, the portion of said support ring free of contact with said flange being spaced from said fender, an aim-adjustable headlamp removably secured upon said ring, a headlamp door removably positioned about said headlamp and the aperture to complete the streamline of said fender and conceal the headlamp supporting structure, and interconnecting means extending between the upper portion of said fender and the upper portion of said ring to firmly support said headlamp within the opening.

2. The combination as set forth in claim 1 wherein said interconnecting means comprises a bracket secured upon said ring and having a finger-like extension secured to said fender.

3. The combination as set forth in claim 2 wherein said interconnecting means is provided with at least one additional finger-like extension, said headlamp door being secured to said additional extension.

4. The combination as set forth in claim 2 wherein said finger-like extension is secured to a fender bracket attached to the inner surface of said fender upper portion.

5. The combination as set forth in claim 3 wherein said headlamp door is formed of a lower portion removably secured upon said lower forward portion of the fender, a visor-like upper door portion formed integrally with said lower portion and having a shape conforming to that of said visor-like upper portion of the fender, said upper door portion being removably secured to said additional finger-like extension.

6. The combination as set forth in claim 5 wherein a sealing gasket is secured to the upper portion of said support ring with its sealing edge in contact with the inner surface of the fender to seal the visor-like portion of the fender from road contaminants.

References Cited in the file of this patent

UNITED STATES PATENTS

| | | |
|---|---|---|
| 1,410,864 | Woolley | Mar. 28, 1922 |
| 1,761,528 | Fyrberg | June 3, 1930 |
| 2,089,672 | Steel | Aug. 10, 1937 |
| 2,218,326 | Anklam | Oct. 15, 1940 |
| 2,218,807 | Breer et al. | Oct. 22, 1940 |
| 2,219,143 | Wharam | Oct. 22, 1940 |
| 2,281,643 | Wahlberg | May 5, 1942 |
| 2,285,591 | Larsen | June 9, 1942 |
| 2,286,448 | Wahlberg | June 16, 1942 |
| 2,293,222 | Sheldrick | Aug. 18, 1942 |